US010291701B2

(12) United States Patent
Venkatesh (10) Patent No.: US 10,291,701 B2
(45) Date of Patent: May 14, 2019

(54) VIRTUALIZING A SHORTCUT TO A FILE IN A CLOUD DESKTOP

(71) Applicant: Wyse Technology L.L.C., Santa Clara, CA (US)

(72) Inventor: Ramanujam Kaniyar Venkatesh, Bangalore (IN)

(73) Assignee: WYSE TECHNOLOGY L.L.C., Santa Clara, CA (US)

( * ) Notice: Subject to any disclaimer, the term of this patent is extended or adjusted under 35 U.S.C. 154(b) by 291 days.

(21) Appl. No.: 15/186,693

(22) Filed: Jun. 20, 2016

(65) Prior Publication Data
US 2017/0364235 A1   Dec. 21, 2017

(51) Int. Cl.
| G06F 3/0481 | (2013.01) |
| G06F 3/0484 | (2013.01) |
| H04L 29/08 | (2006.01) |
| G06F 9/445 | (2018.01) |

(52) U.S. Cl.
CPC ...... H04L 67/1095 (2013.01); G06F 9/44505 (2013.01)

(58) Field of Classification Search
CPC ............ G06F 3/04817; G06F 3/04842; H04L 67/1095
See application file for complete search history.

(56) References Cited

U.S. PATENT DOCUMENTS

| 2004/0133570 A1* | 7/2004 | Soltis ............... G06F 17/30194 |
| 2005/0254072 A1* | 11/2005 | Hirai ..................... G06T 3/4092 |
| | | 358/1.2 |
| 2008/0201457 A1* | 8/2008 | London .................. H04L 29/06 |
| | | 709/222 |
| 2009/0100448 A1* | 4/2009 | Baker, III ................ G06F 8/61 |
| | | 719/330 |
| 2009/0327905 A1* | 12/2009 | Mascarenhas .......... H04L 67/36 |
| | | 715/738 |

(Continued)

OTHER PUBLICATIONS

"Rename Desktop Shortcuts", published to web Dec. 9, 2008 and retrieved May 29, 2018 from http://www.basiccomputerinformation.ca/rename-desktop-shortcuts/.*

(Continued)

*Primary Examiner* — Shourjo Dasgupta
(74) *Attorney, Agent, or Firm* — Kirton McConkie; Brian Tucker (57) ABSTRACT

A shortcut to a file in a cloud desktop can be virtualized. A file shortcut virtualizer can be executed on a server and a client terminal that establishes remote sessions with the server. Server-side components of the file shortcut virtualizer can be configured to identify when a file shortcut has been created on a user's cloud desktop and to send information about each created shortcut to client-side components of the file shortcut virtualizer. The client-side components can then employ this information to create a virtual shortcut for each file shortcut on the user's cloud desktop. A virtual shortcut corresponding to a particular file can be configured to invoke a remote application launcher and can include information identifying a connection file that the remote application launcher should use to directly open the particular file using an associated remote application.

20 Claims, 8 Drawing Sheets

(56) References Cited

U.S. PATENT DOCUMENTS

| | | | | |
|---|---|---|---|---|
| 2011/0138295 A1* | 6/2011 | Momchilov | .......... | G06F 3/0484 715/740 |
| 2011/0251992 A1* | 10/2011 | Bethlehem | .......... | H04L 12/2863 707/610 |
| 2013/0205251 A1* | 8/2013 | Cisler | ............... | G06F 17/30126 715/810 |
| 2013/0282830 A1* | 10/2013 | Besen | ............... | G06F 17/30079 709/205 |
| 2016/0094499 A1* | 3/2016 | Uraizee | ................... | H04L 51/08 715/752 |

OTHER PUBLICATIONS

"[MS-SHLLINK]: Overview", retrieved May 29, 2018 from https://msdn.microsoft.com/en-us/library/dd891308.aspx.*

Greg Shultz, "Launching Remote Desktop From the Command Line in Windows XP Pro", published to web Dec. 13, 2006 and retrieved May 29, 2018 from https://www.techrepublic.com/article/launching-remote-desktop-from-the-command-line-in-windows-xp-pro/.*

"RDP File Extension", published to web Dec. 21, 2009 and retrieved May 29, 2018 from https://fileinfo.com/extension/rdp.*

"[MS-SHLLINK]: Shell Link (.LNK) Binary File Format", published Oct. 16, 2015 and retrieved May 29, 2018 from https://msdn.microsoft.com/en-us/library/dd871305.aspx.*

Chris Sanders, "Using the Remote Desktop Client From the Command Prompt", uploaded to web Feb. 2, 2006 and retrieved May 29, 2018 from http://techgenix.com/usingremotedesktopclientcommandprompt/.*

Greg Shields, "Deploying Applications With Terminal Services". uploaded to web 2009 and retrieved May 29, 2018 from https://technet.microsoft.com/en-us/library/2009.01.terms.aspx.*

ValicorTraining user account, "How to Copy Hosted Files to the Local Desktop" YouTube video, posted on Sep. 27, 2013 to https://www.youtube.com/watch?v=dZ6WPYgZPT0 (Year: 2013).*

* cited by examiner

VIRTUALIZING A SHORTCUT TO A FILE IN A CLOUD DESKTOP

CROSS-REFERENCE TO RELATED APPLICATIONS

N/A

BACKGROUND

Microsoft's RemoteApp is a remote desktop technology which allows a program that is executed in a remote session on the server to appear on the client terminal as if it was a locally-executing program. For example, with RemoteApp, a program that is accessed through Remote Desktop Services (i.e., a RemoteApp program), will run within its own resizable window (as opposed to being displayed within a window containing the entire remote desktop), can be dragged between multiple monitors, and has its own entry in the taskbar.

RemoteApp programs can be launched from the client terminal in a number of different ways including by selecting the corresponding icon in the browser-based Remote Desktop Web Access, by selecting a start menu shortcut for a RemoteApp and Desktop Connection installed via the Control Panel, or by selecting an RDP file installed via MSI generated in RemoteApp Manager. Regardless of which technique is used to select the RemoteApp program to be launched, the same process is followed to connect to the RemoteApp program. In particular, when a user provides input on a client terminal requesting the execution of a RemoteApp program, the Remote Desktop Connection executable (mstsc.exe) is launched and uses the contents of an RDP file to create an RDP connection to a specified endpoint (e.g., a server or a virtual machine). The RemoteApp program is then executed on the endpoint (i.e., within a cloud desktop) with its display output being redirected over the remote session to the client terminal for display within the dedicated client-side window.

As indicated above, a user can access a RemoteApp program in a number of different ways from a client terminal. In each case, an icon or shortcut can be employed on the client device to represent the RemoteApp program in much the same way that locally installed programs are presented. For example, a shortcut to a RemoteApp program could be displayed within the start menu or user's desktop of the locally executing operating system to allow the RemoteApp program to be executed with a simple click of the shortcut. Although these techniques facilitate launching a RemoteApp program, it is currently not possible to create a shortcut on the client terminal to a particular file associated with a RemoteApp program. For example, if the RemoteApp program is Microsoft Word, a shortcut could be created on the client terminal to launch Microsoft Word as a RemoteApp program, but a shortcut to a Word document could not be created on the client terminal. The primary reason for this is that the Word document does not actually exist on the client terminal since Word is executing on the endpoint (e.g., in a session on the server) rather than on the client terminal.

Figure 1A:
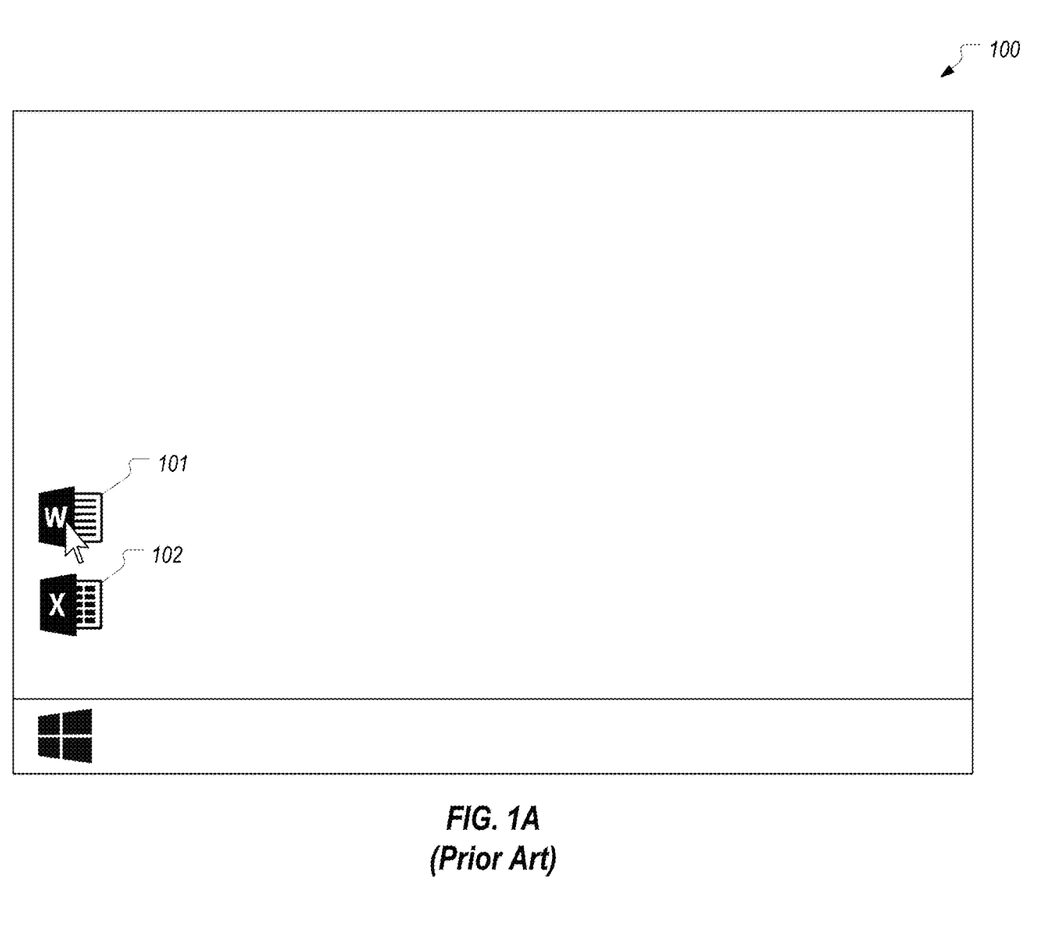
FIGS. 1A-1C represent an example of how a file can be opened within a remote application in accordance with the limitations of the prior art.
Figure 1B:
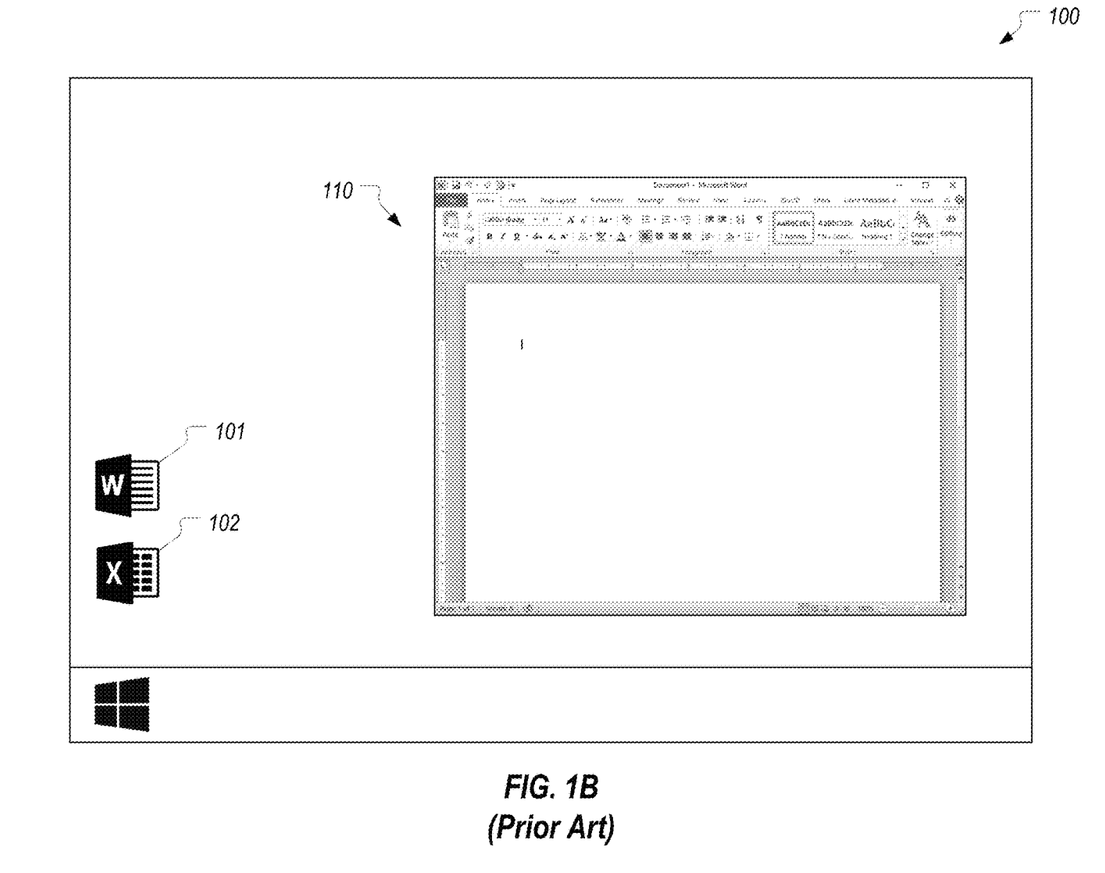
Figure 1C:
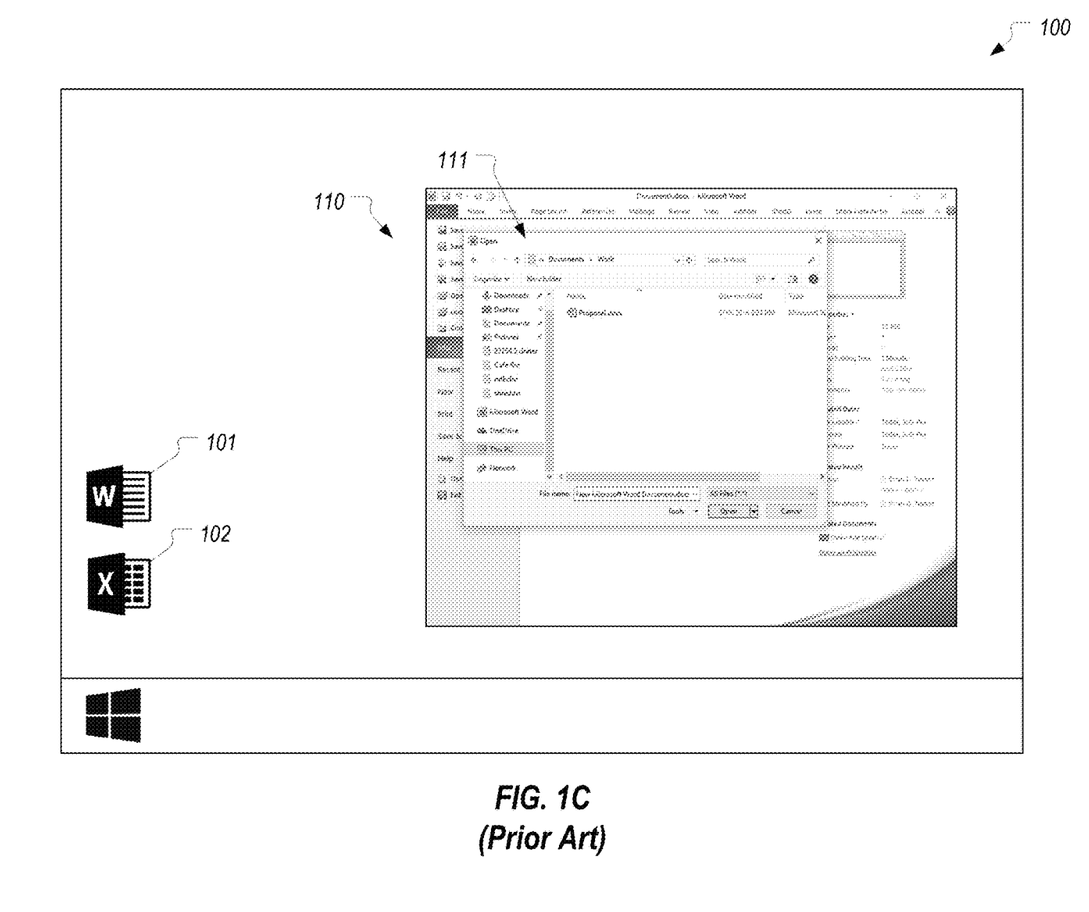

For this reason, in order to open a particular file in a RemoteApp program, the user is required to launch the RemoteApp program and then navigate to the desired file. This process is represented in FIGS. 1A-1C. In FIG. 1A, a typical desktop 100 that is provided on a client terminal is illustrated as including a shortcut 101 to Microsoft Word as a RemoteApp program and a shortcut 102 to Microsoft Excel as a RemoteApp program. It will be assumed that the user of the client terminal desires to open a Word document Proposal.docx that the user had previously saved while within the RemoteApp version of Microsoft Word. Therefore, as represented by the arrow over shortcut 101 in FIG. 1A, the user has clicked on shortcut 101 thereby initiating the process of establishing a remote session with a server (not shown) within which Microsoft Word will be executed. Alternatively, as indicated above, the user could invoke Microsoft Word by opening Remote Desktop Web Access and selecting the icon for Microsoft Word, by selecting a start menu shortcut to Microsoft Word, or by selecting an RDP file for Microsoft Word.

Regardless of the technique employed to launch Microsoft Word as a RemoteApp and as shown in FIG. 1B, a window 110 is generated on the client terminal that includes the display output of Microsoft Word which is provided to the client terminal over the remote session. As shown, window 110 appears substantially identical to the window that is generated when Microsoft Word is locally executed. For purposes of this example, it will be assumed that Microsoft Word is configured to open a blank document (Document1.docx) when launched.

With Word executing on the server and its display output being remoted to the client terminal for display in window 110, the user can commence interacting with Word including to open the desired Proposal.docx file. To do so, the user can employ the File menu to invoke the Open command (or alternatively could employ the CTRL+O or CTRL+F12 keyboard shortcuts). In response to the selection of the Open command, the Open dialog box 111 will be displayed within which the user can navigate to and select the Proposal.docx file as is shown in FIG. 1C.

This process of opening a specific file within a RemoteApp program is tedious and does not emulate the process commonly employed to open files with a locally-executing application, i.e., by selecting a shortcut to the files. For example, this inability to employ a shortcut to the Proposal.docx file on the client terminal when Word is provided as a RemoteApp may cause many users to be dissatisfied with the RemoteApp technology. However, when Word is only provided as part of a cloud desktop, the only other option the user would have is to log into the cloud desktop on which shortcuts to files could be stored. In short, there is no option for creating a shortcut on the client terminal to a file that is associated with a RemoteApp program (i.e., stored on the server in the user's desktop). The only client-side shortcuts that are available are the shortcuts to the RemoteApp program itself, not to any files associated with the RemoteApp program.

BRIEF SUMMARY

The present invention extends to methods, systems, and computer program products for virtualizing a shortcut to a file in a cloud desktop. A file shortcut virtualizer can be executed on a server and a client terminal that establishes remote sessions with the server. Server-side components of the file shortcut virtualizer can be configured to identify when a file shortcut has been created on a user's cloud desktop and to send information about each created shortcut to client-side components of the file shortcut virtualizer. The client-side components can then employ this information to create a virtual shortcut for each file shortcut on the user's cloud desktop.

A virtual shortcut corresponding to a particular file can be configured to invoke a remote application launcher and can include information identifying a connection file that the remote application launcher should use to directly open the particular file using an associated remote application. In this way, the selection of a virtual shortcut on the client terminal will result in a file stored on the user's cloud desktop being immediately opened within the associated remote application without requiring the user to navigate to and select the file from within the already executing remote application.

In one embodiment, the present invention is implemented as a method for creating a virtual shortcut on a client terminal to a file stored on a cloud desktop on a server. A file shortcut virtualizer executing on a client terminal can receive information regarding a file shortcut that has been created on a cloud desktop of a user of the client terminal. The information includes a link target of the file shortcut that identifies a file stored on the cloud desktop. A virtual shortcut can then be created on the client terminal. This virtual shortcut can include a link target identifying a remote application launcher on the client terminal and one or more parameters to be employed by the remote application launcher when the virtual shortcut is selected to cause the file stored on the cloud desktop to be opened within an associated remote application.

In another embodiment, the present invention is implemented as computer storage media storing computer executable instructions which implement a file shortcut virtualizer that includes: a finder component that is configured to execute on a server to identify file shortcuts that have been created within a cloud desktop of a user and to obtain information about each identified file shortcut, the information including a link target of each identified file shortcut; a sender component that is configured to execute on the server to receive the information about each identified file shortcut from the finder component and to send the information about each identified file shortcut to a receiver component; the receiver component that is configured to execute on a client terminal that establishes remote sessions with the server to allow the user to access the cloud desktop, the receiver component configured to receive the information about each identified file shortcut from the sender component; and a creator component that is configured to execute on the client terminal to receive the information about each identified file shortcut. For each identified file shortcut, the creator component can create a virtual shortcut on the client terminal, each virtual shortcut including a link target identifying a remote application launcher on the client terminal. Each virtual shortcut can also identify one or more parameters to be employed by the remote application launcher when the virtual shortcut is selected to thereby cause a file identified by the link target of the corresponding file shortcut to be opened within an associated remote application.

In another embodiment, the present invention can be implemented as a method for creating a virtual shortcut. A file shortcut that has been created on a user's cloud desktop on a server can be identified. Information, including a link target of the file shortcut, can be extracted from the file shortcut and sent to a client terminal. In response to receiving the information on the client terminal, a connection file can be created on the client terminal that identifies the link target of the file shortcut and a remote application associated with the link target of the file shortcut. A virtual shortcut can also be created on the client terminal that identifies a remote application launcher as a link target and that identifies the connection file.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

The present invention can be implemented to allow a shortcut to a file on a cloud desktop to be virtualized on the client terminal. In other words, by employing the techniques of the present invention, a shortcut to a file associated with a RemoteApp program can be stored on the client terminal's desktop in the same manner that shortcuts to files associated with a locally-executed application are stored. The present invention therefore causes a RemoteApp program to behave, from the user's perspective, much more like a "normal" application.

In this specification and the claims, a shortcut to a file will be referred to as being virtualized (or as a virtual shortcut) when the file is stored in a cloud desktop but the shortcut exists on the client terminal. The term cloud desktop should be construed as encompassing any desktop that exists on a different computing system from a client terminal but that is accessible from the client terminal via a remoting protocol such as the Remote Desktop Protocol (RDP), the Independent Computing Architecture (ICA) protocol, the PC-over-IP (PCoIP) protocol, the vWorkspace protocol, etc. Depending on the endpoint, the cloud desktop may exist within a server session (e.g., when the endpoint is a Terminal Server running a version of the Windows Server OS) or may exist as a separate desktop on a computing device running a desktop OS such as Windows 7. The term remote session will be used to refer to the connection created between a client terminal and a server using a remoting protocol. A remote desktop connection established with RDP in a Windows environment is one example of a remote session.

The term remote application should be construed as encompassing any application that executes within a cloud desktop but that is virtualized on a client terminal as if it were executing locally (i.e., that is displayed within its own window on the client terminal). Therefore, a RemoteApp program is only one example of a remote application, and the present invention can be employed with other non-Microsoft-specific remote application technologies. The term remote application launcher will be used to refer to the client-side executable that is tasked with establishing a remote session over which a remote application is provided to the client terminal. The Remote Desktop Connection executable (mstsc.exe) in the Windows OS is one non-limiting example of a remote application launcher.

Figure 2A:
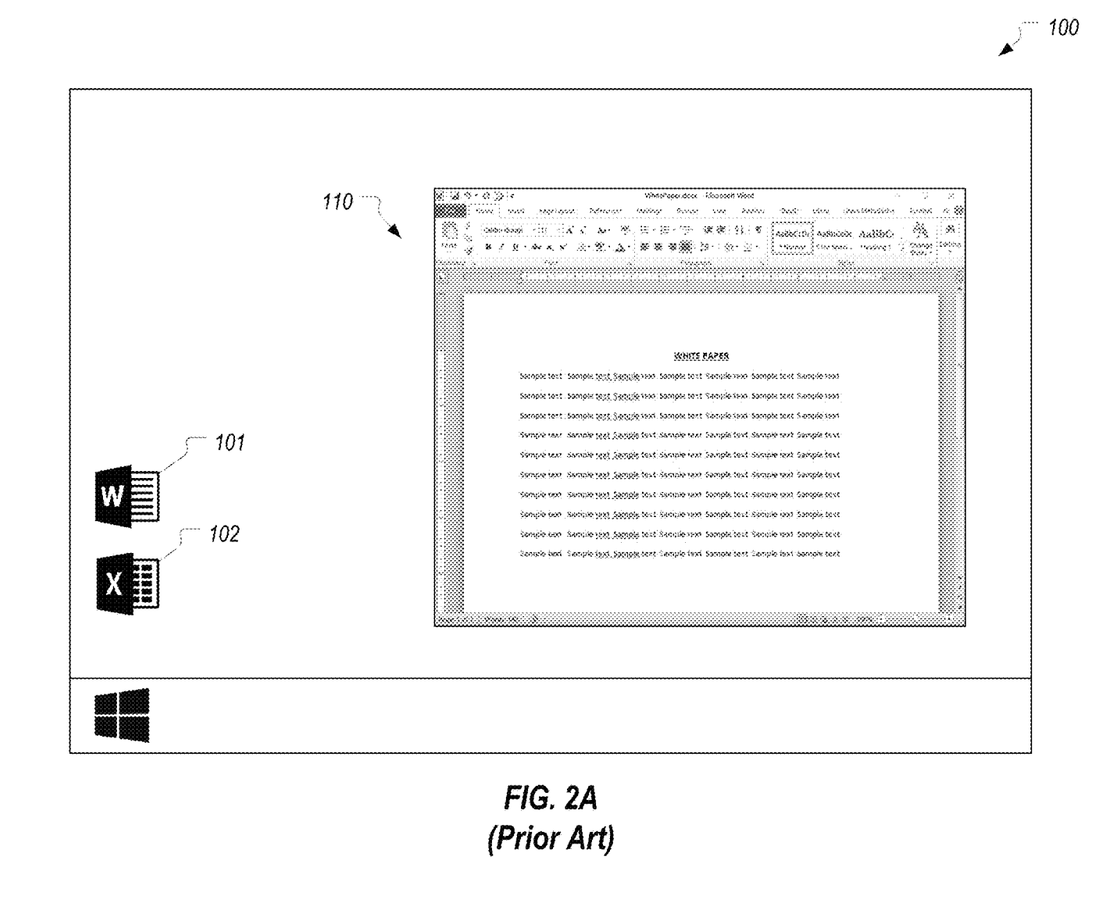
FIGS. 2A and 2B illustrate an example of how a shortcut to a file can be created on a user's cloud desktop.
Figure 2B:
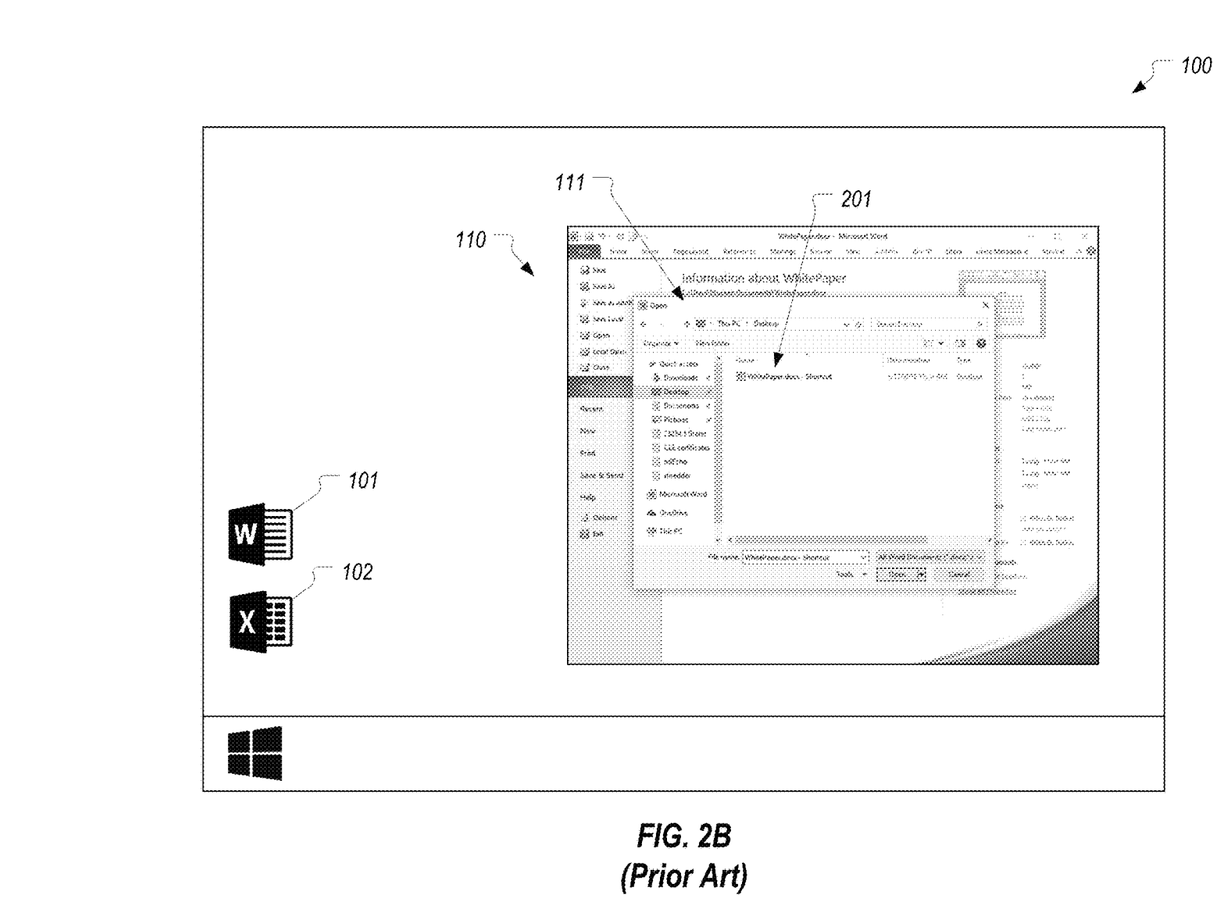

FIGS. 2A and 2B represent a typical process of creating a shortcut to a file associated with a remote application on a cloud desktop. For purposes of this example, it will be assumed that the same user described above with reference to FIGS. 1A-1C has created a new Word document (WhitePaper.docx) while working in the RemoteApp version of Microsoft Word as is represented in FIG. 2A. Therefore, WhitePaper.docx will exist at some location on the user's cloud desktop (i.e., on the server). Turning to FIG. 2B, it will be assumed that the user has created a shortcut 201 to the WhitePaper.docx file on the cloud desktop. FIG. 2B shows that the user creates shortcut 201 via the Open dialog box 111. However, as is known in the art, a shortcut to a file can be created in a number of different ways. Therefore, the particular manner in which a shortcut is created is not important to the invention. What is important is the fact that shortcut 201 is created on the cloud desktop (i.e., on the server) as opposed to on desktop 100 (which would not be possible using prior art techniques).

The user may choose to create shortcut 201 for any reason such as, for example, so that the shortcut will exist within the default folder that is initially opened within the Open dialog box (e.g., the desktop folder) while the file itself may be stored in a different folder that would require navigation (e.g., H:\Technical Documents\username\new product\). This would allow the user to quickly open the file via the Open dialog box without needing to navigate to the folder where the WhitePaper.docx file is actually stored. However, even in this scenario, the user will still be required to launch Microsoft Word, invoke the Open command, and then select the shortcut from within the Open dialog box in order to open the WhitePaper.docx file as described in the background.

In accordance with embodiments of the present invention, a file shortcut virtualizer can be provided to identify file shortcuts that exist on a cloud desktop and to create corresponding virtual shortcuts on a client terminal. These virtual shortcuts can be configured with the appropriate information to allow the associated remote application to be launched with the corresponding file. As a result, a file that is stored on a cloud desktop can be opened directly via a shortcut on the client terminal as if the associated application were a locally-executed application.

Figure 3:
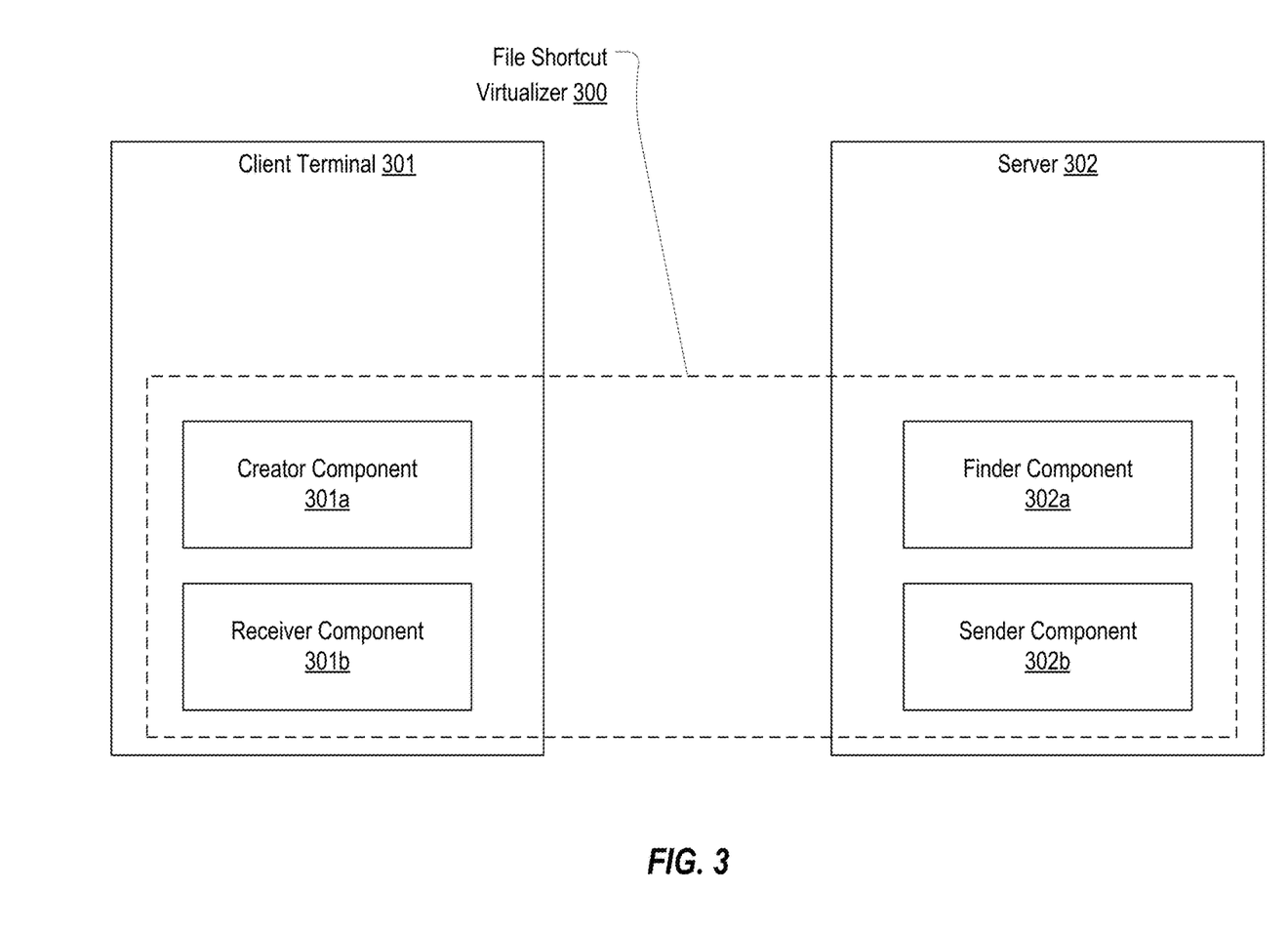
FIG. 3 illustrates an example architecture of a file shortcut virtualizer in accordance with one or more embodiments of the present invention.

FIG. 3 illustrates an example architecture of a file shortcut virtualizer 300. In FIG. 3, a client terminal 301 and a server 302 are depicted. Client terminal 301 can represent any computing device that is capable of establishing a remote session with server 302 for the purpose of virtualizing a remote application using any suitable remoting protocol (e.g., using RDP, ICA, PCoIP, etc.). By way of example, client terminal 301 could be a desktop or laptop computer, a thin client, a smart phone or other mobile device, etc. Server 302 can generally represent any type of computing device that can execute an application and virtualize the application to client terminal 301 via the established remote session. By way of example only, server 302 can be a server that implements Microsoft's Terminal Server or a PC that includes a version of the Windows OS that supports incoming Remote Desktop connections. It is again emphasized that the present invention should not be limited to Microsoft-specific implementations, but could be employed when other remoting protocols/techniques are used to virtualize a remote application on a client terminal.

As shown, file shortcut virtualizer 300 includes a number of client-side and server-side components. The server-side components include a finder component 302a that is configured to find any file shortcuts that have been created on the cloud desktop. For example, finder component 302a can be configured to search through files stored on the cloud desktop to identify any files of type .lnk which is the extension employed by Windows for file shortcuts. A .lnk file contains a structure (called a shell link) that conforms to the Shell Link Binary File Format. As one of skill in the art would understand this structure, a detailed discussion of the structure will not be provided. Suffice it to say that a .lnk file stores a link target (in a LINKTARGET_IDLIST structure) which, in the context of the present invention, defines a file to be opened when the .lnk file is selected. Also, a .lnk file will typically include user interface information (in a STRING_DATA structure) which stores a name/description of the shortcut and a location of an icon that are used to display the shortcut to the end user. For example, when the shortcut is to a Word document, the .lnk file will identify the location of the Word document icon. These server-side shortcuts will typically be, but are not required to be, created by the server's OS in the typical fashion.

In short, the .lnk file stores all the information necessary for the operating system to properly display a shortcut and to open the appropriate file when the shortcut is selected. Accordingly, finder component 302a can be configured to first examine the contents of a .lnk file stored on server 302 to determine whether the .lnk file pertains to a file (as opposed to an application) and, if so, extract/obtain information necessary to create a corresponding virtual shortcut on the client terminal 301. This information can include the link target (e.g., H:\Technical Documents\username\new product\WhitePaper.docx) as well as possibly the application used to open the link target (e.g., the application identified in the "Opens with" property of a shortcut which in this example would be Microsoft Word). It may be desirable to specify which application on the server is assigned to open a link target since the default application may be different on the server than on the client terminal. In other words, it may not necessarily be assumed that server 302 is configured to open .docx files with Microsoft Word. However, in some embodiments, it may be assumed that files will be opened by their typical (i.e., default) applications such that it would not be necessary to specify which application is associated with a particular shortcut on server 302 (i.e., the associated application can be derived from the file extension in the link target). Accordingly, in some embodiments, finder component 302a may only extract the link target from a shortcut. However, in many embodiments, finder component 302a may extract further information (e.g., the name/description of the shortcut) from a shortcut to allow the corresponding virtual link that will be created to appear substantially identical to the shortcut.

Accordingly, when finder component 302a identifies a file shortcut, it can obtain the details of the file shortcut and provide them to sender component 302b. For example, with reference to FIG. 2B, finder component 302a may scan the files stored on the user's cloud desktop and identify shortcut 201. Finder component 302a may then read the details of shortcut 201 to identify that the shortcut has a link target of H:\Technical Documents\username\new product\WhitePaper.docx and a name of WhitePaper.docx—Shortcut and could also determine that Microsoft Word is used to open this file. Finder component 302a could then provide these details (among possibly other details that are commonly included in file shortcuts) to sender component 302b.

Sender component 302b can be configured to send such details of each identified file shortcut to receiver component 301b. As an example, while client terminal 301 has established a remote session with server 302, sender component 302b and receiver component 301b can establish a virtual channel within the remote session and employ this virtual channel to communicate any file shortcut details.

Upon receiving file shortcut details, receiver component 301b can provide the details to creator component 301a. Creator component 301a can employ these details to perform two primary functions: (1) create a virtual shortcut (i.e., a .lnk file) on client terminal 301 for each identified shortcut; and (2) for each virtual shortcut, create an .RDP file containing the appropriate information for launching the corresponding remote application with the file that the shortcut targets.

These virtual shortcuts can appear to the user as if they were normal file shortcuts. However, unlike a normal file shortcut (i.e., unlike a shortcut to a locally stored file that will be opened by a locally executing application), the link target in these virtual shortcuts will not point to the file. Instead, the link target will be the remote application launcher on client terminal 301. As a result, when the virtual shortcuts are selected, the remote application launcher will be invoked. In essence, the virtual shortcuts will be more like application shortcuts rather than file shortcuts since the link target is an application rather than a file.

To ensure that the remote application launcher, when invoked, will cause the corresponding file to be opened in the corresponding remote application, creator component 301a can configure each virtual shortcut to include appropriate command line arguments. For example, a .lnk file can include a COMMAND_LINE_ARGUMENTS structure which defines any command line arguments to be provided when invoking the link target. A remote application launcher, such as mstsc.exe, may allow a command line argument that identifies a connection file which defines parameters to be employed when establishing a remote session. For example, in the case of mstsc.exe, an .RDP file can be specified as a command line parameter (e.g., MSTSC [<connection file>] where connection file represents the name of an .RDP file). The .RDP file corresponding to a shortcut can include, among possibly many other parameters, an identification of the remote application to invoke and an identification of a command line parameter to be provided to the remote application which will cause the remote application to open the corresponding file. Accordingly, when a virtual shortcut is selected, the remote application launcher will be invoked with a connection file that specifies that a particular remote application should be executed and that a particular file should be opened.

Figure 4:
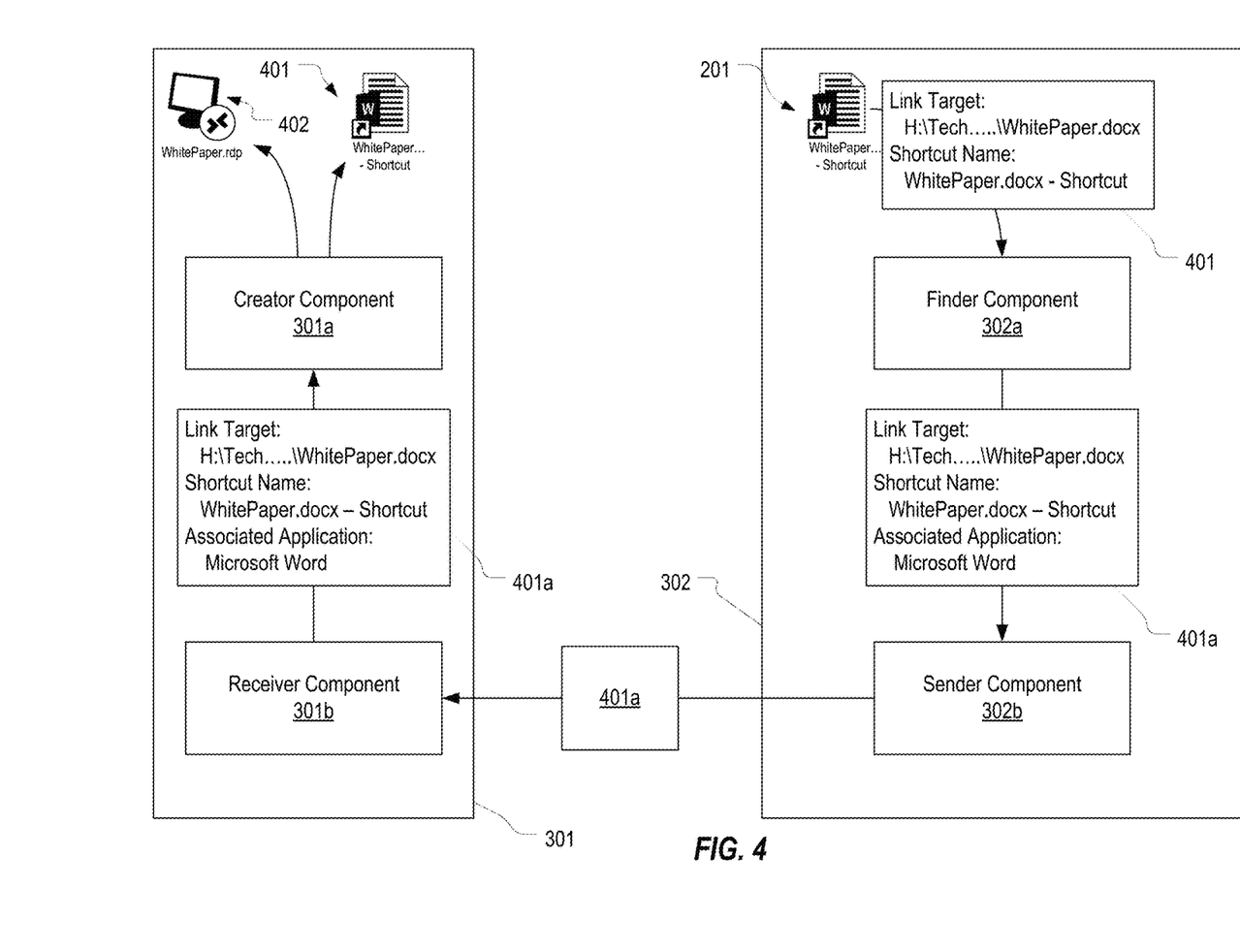
FIG. 4 illustrates an example process that the file shortcut virtualizer can perform to create a virtual shortcut on a client terminal that allows a file stored on a user's cloud desktop to be directly opened within a remote application.

FIG. 4 provides an example of the process that file shortcut virtualizer 300 can perform to create a virtual shortcut. In this example, it will be assumed that client terminal 301 and server 302 are each executing a Windows OS and therefore mstsc.exe is the remote application launcher. It will also be assumed that a shortcut 201 of type .lnk has been created on a user's cloud desktop on server 302 and that shortcut 201 has a link target of H:\Technical Documents\username\new product\WhitePaper.docx and is named WhitePaper.docx—Shortcut.

In a first step, finder component 302a will scan the cloud desktop for file shortcuts and will therefore identify shortcut 201. Finder component 302a can then extract the appropriate information 401 from shortcut 201. In this example, it will be assumed that this information 401 includes the link target defined in shortcut 201 and the name of shortcut 201. As indicated above and shown in FIG. 4, the link target of shortcut 201 is a file of type .docx (i.e., a Word document). For any other shortcut that is found, finder component 302a can extract similar information.

It will also be assumed in this example that finder component 302a is configured to identify which application on server 302 is configured to open files that are link targets (i.e., which application is the default application for the particular link target). In this case, it is assumed that finder component 302a identifies that Microsoft Word is the default application for files of type .docx. It is noted that this identification of a default application is not necessarily defined in the shortcut itself but is determined based on current OS settings.

Once the appropriate information is obtained for each identified shortcut, finder component 302a can provide information 401a to sender component 302b. Information 401a includes information 401 as well as the identification of Microsoft Word as the default application for the defined link target. If finder component 302a had found additional shortcuts, additional sets of information similar to information 401a could also be provided to sender component 302b (e.g., if a shortcut to an Excel file exists, the link target to that Excel file, the name of the shortcut, and an indication of Microsoft Excel could be provided). Sender component 302b can then send information 401a over a remote session (e.g., via a virtual channel) to receiver component 301b on client terminal 301 which will then provide information 401a to creator component 301a.

As indicated above, for each set of information identifying a file shortcut that has been created on server 302, creator component 301a can create a virtual shortcut as well as a connection file. For example, in FIG. 4, creator component 301a is shown as creating a virtual shortcut 401 and an .RDP file 402 on client terminal 301. Although not represented in FIG. 4, virtual shortcut 401 can typically be created on desktop 100 while .RDP file 402 can be created in a dedicated folder (e.g., within a folder storing the executable(s) for creator component 301a and receiver component 301b).

As described above, creator component 301a can configure virtual shortcut 401 to have a link target of mstsc.exe and can specify a command line argument of WhitePaper.rdp so that, when virtual shortcut 401 is selected, mstsc.exe will establish a remote session in accordance with the contents of WhitePaper.rdp. Creator component 301a can therefore also configure WhitePaper.rdp to include the appropriate parameters to cause Whitepaper.docx to be opened within Microsoft Word. For example, creator component 301a can configure WhitePaper.rdp to include:

remoteapplicationprogram:s:C:\Program Files\Microsoft Office\Office14\Winword.exe     remoteapplicationcmdline:s:"H:\Technical Documents\username\new product\WhitePaper.docx"

These parameters would instruct mstsc.exe to invoke Winword.exe with a command line argument of the path to WhitePaper.docx on the server such that Word will open WhitePaper.docx upon executing. Accordingly, if the user selects virtual shortcut 401, the end result will be that Word will be executed as a remote application with WhitePaper.docx opened thereby emulating the result of selecting a shortcut to a local file.

In addition to configuring virtual shortcut 401 and connection file 402 to cause WhitePaper.docx to be immediately opened, creator component 301a can also configure virtual shortcut 401 so that it will be displayed as if it were a file shortcut to a Word document. As indicated above, virtual shortcut 401 is actually a shortcut to the remote application launcher, not to a particular file. Therefore, to ensure that virtual shortcut 401 will be displayed with the appropriate icon, creator component 301a, can include the location of the Word Document icon in virtual shortcut 401. For example, creator component 301a can create an ICON_LOCATION structure within virtual shortcut 401 which identifies the location where the Word document icon is stored on client terminal 301. This will ensure that virtual shortcut 401 will appear to the user as if it were a shortcut to a Word document (i.e., the OS on client terminal 301 will display the shortcut using the Word document icon as opposed to the icon for MSTSC). Creator component 301a can also populate any other information about shortcut 201 (e.g., its name and description) into virtual shortcut 401 so that virtual shortcut 201 will appear substantially similar to shortcut 201.

It is noted that creator component 301a is described as creating a separate connection file for each virtual shortcut. This is necessary when the remote application launcher is MSTSC since MSTSC does not allow all connection parameters to be specified individually as command line arguments (i.e., MSTSC requires an .RDP file to specify many connection parameters including those for indicating that a remote application should be executed). However, in some embodiments where the remote application launcher would allow, all connection parameters necessary for invoking the remote application with the corresponding file could be included in the virtual shortcut itself rather than in a separate connection file. For example, in such embodiments, the COMMAND_LINE_ARGUMENTS structure of the virtual shortcut could include all connection parameters such that these connection parameters would not need to be stored in a separate file. Accordingly, the present invention should not be limited to embodiments where the .lnk file includes a reference to a connection file where connection parameters are stored but should include embodiments where the connection parameters are stored directly within the .lnk file.

Also, even though the above description has referred to .lnk files as the only type of shortcut file, this is due only to the prevalence of the Shell Link Binary File Format. It is to be understood that the techniques of the present invention could be employed when shortcuts are defined in accordance with a different file format or file extension.

Figure 5:
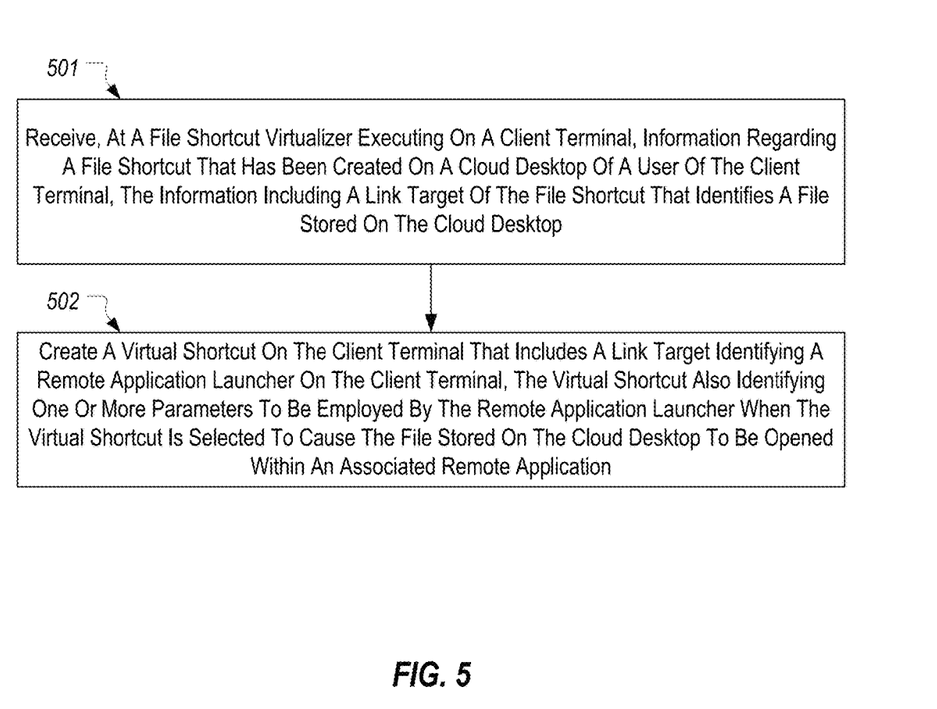
FIG. 5 illustrates a flowchart of an example method for creating a virtual shortcut.

FIG. 5 illustrates a flowchart of an example method 500 for creating a virtual shortcut on a client terminal to a file stored on a cloud desktop on a server. As an example, method 500 can be implemented by the client-side components of file shortcut virtualizer 300.

Method 500 includes an act 501 of receiving, at a file shortcut virtualizer executing on a client terminal, information regarding a file shortcut that has been created on a cloud desktop of a user of the client terminal, the information including a link target of the file shortcut that identifies a file stored on the cloud desktop. For example, creator component 301a can receive information 401a which identifies a link target of shortcut 201.

Method 500 includes an act 502 of creating a virtual shortcut on the client terminal that includes a link target identifying a remote application launcher on the client terminal, the virtual shortcut also identifying one or more parameters to be employed by the remote application launcher when the virtual shortcut is selected to cause the file stored on the cloud desktop to be opened within an associated remote application. For example, creator component 301a can create virtual shortcut 401 which includes a link target of mstsc.exe. Creator component 301a may also create connection file 402 and include an identification of connection file 402 in virtual shortcut 401. Alternatively, in some embodiments, creator component 301a may include connection parameters directly in virtual shortcut 401 rather than within a separate connection file 402.

In summary, the present invention can be employed to automatically create virtual shortcuts on a user's local desktop corresponding to file shortcuts that have been created on the user's cloud desktop. A virtual shortcut can be configured to cause the link target of the corresponding file shortcut to be directly opened when the virtual shortcut is selected. In this way, the user's local desktop can mirror his or her cloud desktop both in appearance and functionality.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for creating a virtual shortcut on a client terminal to a file stored on a cloud desktop on a server, the method comprising:
    identifying, on a server, a file shortcut that has been created on a user's cloud desktop;
    in response to identifying the file shortcut, extracting information from the file shortcut, the information including a link target of the file shortcut, the link target identifying a file stored on the user's cloud desktop;
    sending the information that was extracted from the file shortcut to a client terminal that the user employs to access the user's cloud desktop;
    receiving, at a file shortcut virtualizer executing on the client terminal, the information that was extracted from the file shortcut;
    in response to receiving the information that was extracted from the file shortcut, creating a virtual shortcut on the client terminal that corresponds to the file shortcut that has been created on the user's cloud desktop, wherein creating the virtual shortcut on the client terminal includes:
    defining a link target within the virtual shortcut that identifies a remote application launcher on the client terminal; and
    defining one or more parameters within the virtual shortcut to be employed by the remote application launcher when the virtual shortcut is selected to cause the file stored on the user's cloud desktop to be opened within an associated remote application.

2. The method of claim 1, further comprising:
    creating a connection file on the client terminal, the connection file identifying the associated remote application and a path to the file stored on the user's cloud desktop;
    wherein the one or more parameters in the virtual shortcut identify the connection file.

3. The method of claim 1, wherein the one or more parameters are defined as command line arguments to be employed when invoking the remote application launcher in response to the selection of the virtual shortcut.

4. The method of claim 3, wherein the virtual shortcut is structured in accordance with the Shell Link Binary File Format and the one or more parameters are included in a COMMAND_LINE_ARGUMENTS_structure.

5. The method of claim 4, wherein the one or more parameters comprise a path to a connection file.

6. The method of claim 5, wherein the connection file is an .RDP file.

7. The method of claim 6, wherein the .RDP file includes a remoteapplicationprogram property that identifies a path to the associated remote application on the server.

8. The method of claim 6, wherein the .RDP file includes a remoteapplicationcmdline property that identifies a path to the file stored on the user's cloud desktop.

9. The method of claim 1, wherein the information that was extracted from the file shortcut includes a name of the file shortcut and an identification of the associated remote application.

10. The method of claim 1, wherein creating the virtual shortcut further comprises:
    including an identification of an icon of the associated remote application in the virtual shortcut such that, when the virtual shortcut is displayed on the client terminal, the icon of the associated remote application is used.

11. The method of claim 1, wherein the information that was extracted from the file shortcut is received over a virtual channel when a remote session is established between the client terminal and the server.

12. One or more computer storage media storing computer executable instructions which implement a file shortcut virtualizer comprising:
    a finder component that is configured to execute on a server to identify file shortcuts that have been created within a cloud desktop of a user and to obtain information about each identified file shortcut, the information including a link target of each identified file shortcut that has been created within the cloud desktop, each identified file shortcut including a link target that identifies a file that has been created on the cloud desktop;
    a sender component that is configured to execute on the server to receive the information about each identified file shortcut from the finder component and to send the information about each identified file shortcut to a receiver component;
    the receiver component that is configured to execute on a client terminal that establishes remote sessions with the server to allow the user to access the cloud desktop, the receiver component configured to receive the information about each identified file shortcut from the sender component; and
    a creator component that is configured to execute on the client terminal to receive the information about each identified file shortcut that has been created within the cloud desktop, and, for each identified file shortcut, create a virtual shortcut on the client terminal for the corresponding file shortcut that has been created within the cloud desktop, each virtual shortcut defining a link target that identifies a remote application launcher on the client terminal, each virtual shortcut also defining one or more parameters to be employed by the remote application launcher when the virtual shortcut is selected to thereby cause the file identified by the link target of the corresponding file shortcut that has been created within the cloud desktop to be opened within an associated remote application.

13. The computer storage media of claim 12, wherein the one or more parameters either specify the link target of the corresponding file shortcut or specify a connection file that includes the link target of the corresponding file shortcut.

14. The computer storage media of claim 13, wherein the one or more parameters either specify the associated remote application or specify the connection file that identifies the associated remote application.

15. The computer storage media of claim 12, wherein each virtual shortcut also specifies an icon of the associated remote application.

16. The computer storage media of claim 12, wherein the creator component is also configured to create a connection file for each virtual shortcut, each connection file including a path to the associated remote application and the link target of the corresponding file shortcut.

17. A method for creating a virtual shortcut comprising:
    identifying, on a server, a file shortcut that has been created on a user's cloud desktop;
    in response to identifying the file shortcut, extracting information from the file shortcut, the information including a link target of the file shortcut, the link target identifying a file stored on the user's cloud desktop;

sending the information that was extracted from the file shortcut to a client terminal that the user employs to access the user's cloud desktop;

in response to receiving the information on the client terminal, creating a connection file on the client terminal that identifies the link target of the file shortcut that has been created on the user's cloud desktop and a remote application associated with the link target of the file shortcut, and creating a virtual shortcut on the client terminal that defines a remote application launcher as a link target and that identifies the connection file such that when the virtual shortcut is selected on the client terminal, the file stored on the user's cloud desktop is opened within the associated remote application.

18. The method of claim 17, wherein the virtual shortcut identifies the connection file as a command line argument for use when invoking the remote application launcher in response to the virtual shortcut being selected.

19. The method of claim 17, wherein the virtual shortcut also identifies an icon of the associated remote application.

20. The method of claim 17, wherein the information includes a name of the file shortcut, the virtual shortcut being assigned the same name.

* * * * *